April 4, 1939. L. M. POTTS Re. 21,042

SELECTIVE CONTROL SYSTEM AND APPARATUS

Original Filed Sept. 19, 1929 3 Sheets-Sheet 1

INVENTOR.
LOUIS M. POTTS

H. B. Whitfield
ATTORNEY.

April 4, 1939. L. M. POTTS Re. 21,042

SELECTIVE CONTROL SYSTEM AND APPARATUS

Original Filed Sept. 19, 1929 3 Sheets-Sheet 2

INVENTOR.
LOUIS M. POTTS

BY H. B. Whitfield

ATTORNEY.

April 4, 1939. L. M. POTTS Re. 21,042

SELECTIVE CONTROL SYSTEM AND APPARATUS

Original Filed Sept. 19, 1929 3 Sheets-Sheet 3

INVENTOR.
LOUIS M. POTTS

BY H. B. Whitfield

ATTORNEY.

Reissued Apr. 4, 1939 Re. 21,042

UNITED STATES PATENT OFFICE 21,042

SELECTIVE CONTROL SYSTEM AND APPARATUS

Louis M. Potts, Evanston, Ill., assignor to Teletype Corporation, Chicago, Ill., a corporation of Delaware Original No. 2,024,012, dated December 10, 1935, Serial No. 648,378, December 22, 1932, which is a division of Serial No. 393,761, September 19, 1929, now Patent No. 2,134,005, October 25, 1938. Application for reissue September 18, 1937, Serial No. 164,492

52 Claims. (Cl. 178—17.5)

The present invention relates to quotation systems and apparatus and more particularly to control form perforating apparatus in which special signals are incorporated within the compass of other signals.

This application is a division of copending application Serial No. 393,761, filed September 19, 1929, now Patent No. 2,134,005, granted October 25, 1938.

Stock quotation systems generally employ three classes of signals commonly identified as item selection signals, price or recorder operating signals and range or qualifying signals. Of these three classes, the first, or item selection signals, usually comprises three characters, each of which is represented alphabetically, while the combination of the three in addition to graphically identifying the particular stock to which the quotation relates, also permutatively controls the selection of the stock at the receiving station.

While there are twenty-six standard characters in the alphabet, the minimum requirements of a Baudot code system to accommodate these characters is a five unit code which affords a permutation of thirty-two possibilities. A four unit code is inadequate, affording only sixteen possibilities. For this reason the first three quotation or item selection signals, which, as described above, relate to the three item selection characters, must include five units in each signal in order to afford permutative possibilities sufficient to accommodate the twenty-six letters of the alphabet.

As contrasted with the foregoing requirements, however, each price digit requirement is but eleven possibilities including 1, 2, 3, 4, 5, 6, 7, 8, 9, 0, and a blank so that the sixteen possibilities afforded by a four unit signal are adequate to accommodate each of the price signals including the fractions signal. In accordance with the commercial stock quotation practice, fractional quotations are always stated in eighths so that its total requirements are but eight possibilities including 0, ⅛, ¼, ⅜, ½, ⅝, ¾, and ⅞.

In addition to selecting and quoting a particular stock, it is also desirable to qualify each quotation, or in other words, to perform a secondary selection, whereby each quotation may be identified in terms of "high", "low", "close" or "last"; that is, whether the particular quotation is the highest quotation of the day, the lowest, yesterday's close, or simply the most recent chronologically. Heretofore, this secondary qualifying signal commonly referred to as a range signal, was transmitted in the form of a separate and individual signal, making the total number of signals required for each quotation eight, including the three primary selection signals and the four price signals.

Accordingly, an object of the present invention is to provide telegraph signal code apparatus employing a predetermined length message and utilizing the full capacity of each signal interval of the message where its primary employment does not fully exhaust its signalling possibilities.

Another object of the present invention is to provide a telegraph apparatus in which a qualifying signal may be included simultaneously with an intelligence signal without extending the overall signalling time of the principal or intelligence signal.

Apparatus is provided herewith including a plurality of sets of keylevers each set of which relates to one of the aforesaid classes of signals. When the keylever relating to the final class of the series is operated, the function being indicative of the conclusion of a message, then a special perforation is made in the control form which serves as an index and regulatory mark during the subsequent use of the control form in the controlled apparatus.

Accordingly, another object of the present invention is to provide means for making an end-of-message mark on a control form as an incidental response to the operation of a keylever which relates to the concluding class in a sequence.

The above and other objects of the present invention are accomplished by impressing a secondary selection signal simultaneously with the four price signals, thereby maintaining the total number of groups of signals at seven while utilizing the unused space of the hundreds, tens, units, or fractions position for correspondingly identifying the particular signal group as being either "high", "low", "last", or "close". Specifically, the invention provides a keyboard perforator arranged with means for controlling storage devices to include in a selected group of other perforations an additional perforation representative of the stock price range. In order to assure the proper sequence of manipulation, means are provided, including a sequence switch, for rendering the various classes of keylevers of the perforator operatively effective in a predetermined succession.

A better understanding of the invention may be had from the following description, taken in conjunction with the accompanying drawings in which.

In the following description, particular reference will be had to the accompanying drawings in which like reference characters designate similar parts throughout the several figures.

Figures 1, 4:
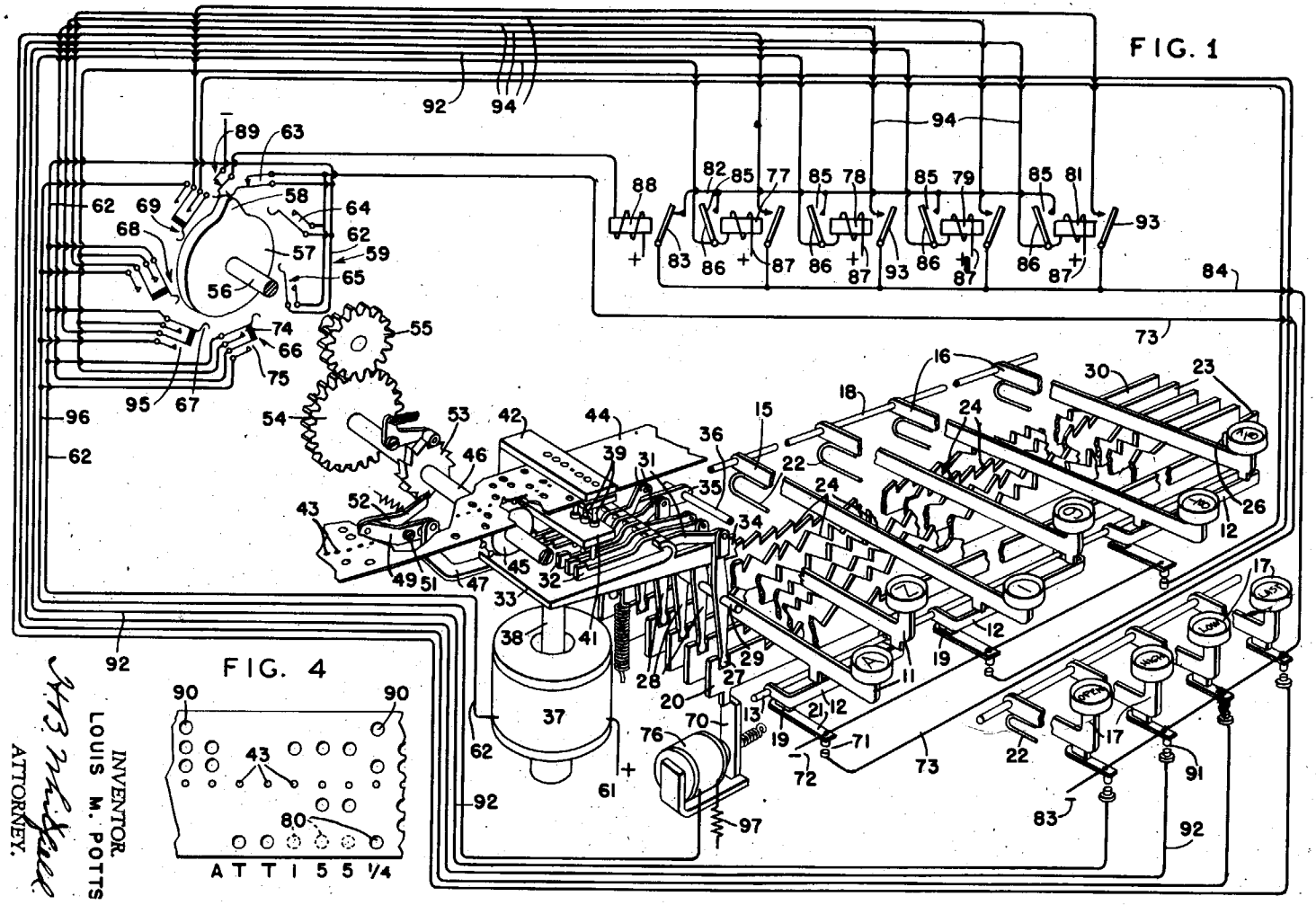
Fig. 1 is a perspective view of a perforator illustrating the keyboard mechanism, and a wiring diagram showing associated therewith, one form of the present invention.
Fig. 4 is a fragmentary detail of a piece of perforated tape having thereon the perforations of a typical quotation message ATT1551/4.

The perforating mechanism illustrated in Fig. 1 is provided with four general classes of keylevers. Of these, the numeral 11 indicates the alphabetical or items designation keylevers which are located to the left of the keyboard and which upon being depressed engage a bail 12 pivoted on a rod 13 by means of depending projections 14 integrally formed with the keylevers. An intermediate set of keylevers 15 relates to the integer price characters and right hand keylevers 16, the fractions price characters. A fourth class of keylevers 17, which have been segregated from the others in the illustration, relates to the range or qualifying characteristics of a quotation. Of the three first described classes of keylevers each is provided with a bail similar to the bail 12 with the item keylevers 11 while the several classes are pivotally carried on a common pivot rod 18. Each bail has individual to it an insulating block 19 adapted to engage a contact spring 21 when it is rocked about its pivot 13 upon the depression of one of its associated keylevers.

As illustrated, the groups of keylevers 11, 15 and 16 are pivoted on a common shaft 18 and are provided with a spacing comb (not shown) while each lever is connected to an individual return spring 22 for maintaining in and returning it to its elevated position. The range keylevers 17 may, if desired, be likewise supported on the rod 18 though, as will be seen in the course of the following description, their relative position with respect to the remainder of the keylevers is optional.

Below the aligned keylevers 11, 15 and 16 are supported a set of five permutation or code bars 23, which are provided with variously located inclined surfaces 24. Of the five code bars 23 the foremost one 26 is cut away as at 26 in the region directly below the units and fractions keylevers 15 and 16, while in the region below the items designation keylevers 11 it is provided with the conventional inclined notches 24 with which the remainder of the code bars 23 are provided throughout. The various inclined surfaces of the five bars 23 are each individually arranged with respect to its bar so that the depression of any one keylever of each set engaging the respective code bars 23 thrusts them rightwardly or leftwardly as the case may be into a definite and particular relationship each to the other.

Since each code bar 23 is capable of assuming two positions, so that the several of them combinedly are capable of assuming thirty-two permutative positions. Accordingly, the depression of each of the item keylevers 11 presents the five code bars permutatively into a position individual to the particular keylever, while the depression of either the units or fractions keylevers, similarly, affects but four of the five bars 23, the other one 26 being cut away as above described, so as not to be affected by the keylevers overlying the cutaway region. It is possible that certain few permutative positions of the several code bars might be common between one of the keylevers of one set and that of another set, but, as will be explained, this apparent indistinction is taken care of by other means provided for distinguishing between one class of keylovers and another.

A sixth code bar 30 generally similar to the five bars 23 is located at the rear of the others. As may be seen in the illustration, the inclined surfaces 24 of this bar which are located beneath the items and digits keylevers 11 and 15 are all inclined in one direction while those which are located beneath the fractions keylevers 16 are inclined in the other direction, so that the depression of a keylever 11 or 15 moves this lever rightwardly while the depression of a keylever 16 moves it leftwardly. This bar 30 will be identified hereinafter as the sixth hole code bar, and its function is to cause the perforation of a sixth hole 90, Fig. 4, in the fractions perforation alignment which, as described in the original application, serves to phase the relationship between transmitting and receiving apparatus by changing the polarity of the start pulse of each complete quotation message.

Each of the six code bars 23 and 30 at its left end is articulated as at 27 to a vertically disposed lever 28, while the several levers 28 are pivoted on a common shaft 29. at their upper ends, levers 28 are each connected to one end of an interposition bar 31 individual thereto, the opposite end of which is provided with a shouldered portion 32. Below the interposition bars 31 is a table 33 having two projecting arms 34 and 35 pivoted at 36. A solenoid 37 disposed below the table 33 has associated with it an armature 38 which is pivotally connected to the table 33 and is adapted, upon the solenoid being energized, to move upwardly rocking the table 33 clockwise about its pivot 36.

Located above the interposition bars 31 is a set of punches 39 supported in a block 41 and adapted to cooperate with a die member 42. When a particular code bar 23 or the sixth code bar 30 is in its left hand position, as viewed in Fig. 1, through its connection with a lever 28, it presents the shoulder portion 32 of its interposition bar 31 directly beneath one of the punches 39, but when, on the contrary, it is in its right hand position the shouldered portion 32 of its corresponding interposition bar 31 is not thus presented, but instead clears its associated punch, so that when thereafter the table 33 is reciprocated, those punches 39 whose associated shoulders 32 are at that instant presented beneath their respective punches will thrust them into the die block 42 while such of them as are not thus present will fail to engage their punches permitting the latter to remain down and out of cooperative engagement with the aforesaid die block.

In addition to the six aligned punches 39 aforementioned, there is another punch intermediately disposed, and adapted to perforate a somewhat smaller hole 43, as illustrated upon the fragment of tape 44, by means of which the prepared tape or form is advanced both in this and other apparatuses. In accordance with the present illustration, the central perforations 43, which will be referred to hereinafter as the feed perforations, are engaged by a feed sprocket 45 carried upon a shaft 46 suitably supported in the framework (not shown). The feed sprocket 45 is rotatably advanced one tooth step at a time concurrently with the reciprocation of table 33 in the following manner.

A bracket 47 is secured to the table 33 and is pivotally connected at 48 to one arm of a lever 49 pivotally secured at 51 so that as the projection 47 reciprocates vertically together with table 33 the former is oscillated concordantly. Upon its clockwise movement, lever 49 carrying a spring loaded pawl 52 thrusts the latter rightwardly, causing it to engage one of the teeth of a ratchet wheel 53 also mounted on shaft 46 and to rotate the latter one tooth distance in a counterclockwise direction, as viewed in this Fig. 1, thereby rotating sprocket wheel 45 and accordingly advancing the tape 44 leftwardly.

Also mounted on shaft 46 is a gear wheel 54 which engages and drives a pinion 55 carried upon a cam shaft 56. On shaft 56 is secured a cam 57 which is provided with an apex 58 normally disposed in a vertical position as shown and which functions as the active members of a sequence switch 59. The driving ratio between pinion 55 and gear 54 is such that for each complete revolution of shaft 56 ratchet wheel 53 and its assembly advance seven radial steps.

The energization of solenoid 37 is coincident with the depression of any of the keylevers 11, 15 or 16 by reason of the following circuit arrangement. One terminal of the winding of solenoid 37 is connected to a positive source of current 61 and its other terminal is connected over circuit 62 to one blade each of the seven radially disposed contact switches 63 to 69 inclusive. Of the several switches, switches 63, 64 and 65 are parallelly connected with the item keylevers 11; switches 66, 67 and 68, with the digits keylevers 15; while switch 69 is connected with the fractions keylevers 16. The several contacts 63 to 69 inclusive and cam 57 constitute a sequence switch 59 which is operated progressively in a clockwise direction.

In its normal position apex 58 engages the flexible blade of switch 63, closing the circuit for one of the item keylevers 11. Upon depressing one of the keys 11 the item bail 12 engages its contact spring 21, closing the circuit at contact points 71 and completing a circuit from positive potential at 61 through the winding of soleoid 37 over line 62, through the closed switch 63 of the sequence switch 59, thence over line 73, contact points 71 to negative potential at 72. This energizes the solenoid 37, reciprocating table 33 which thereupon performs a perforating operation, and advances the ratchet wheel 53 one tooth distance, while at the same time rotating cam 57 one seventh of its revolution so that its apex 58 engages switch 64, which latter also relates to the character keylevers 11. The depression of the next two character keylevers 11 responds similarly to the one just described, except that in each case apex 58 advances, closing the contacts 65 and 66, respectively.

After the depression of the third keylever 11 apex 58 is presented opposite switch 66 which incidentally carries two sets of contact points 74 and 75, one set 74 of which relates to and is connected with the solenoid 37, while the other set 75 closes a circuit for a magnet 76 located to the left of the special bar 25. Switches 67, 68 and 69 are of similar construction to switch 66 insofar as each is provided with two sets of contact points, one set each of which is connected parallelly for closing the circuit of range magnet 76, while the other set of each prepares the circuit for its respective class of keylevers.

Each of the keylevers 17 has associated with it a locking relay so that, depending upon which of the keylevers "open", "high", "low" or "last" is depressed, a corresponding relay 77 to 81 is energized and held in locked position through a locking circuit 82 and locking armature 83 especially provided therefor. The locking circuit is traceable from negative potential 83 over line 84, through armature 83, line 82, one of the contacts 85 and its associated armature 86 through the winding of its particular relay 77 to 81 to positive potential 87. Armature 83 is controlled by a magnet 88 energized through a pair of contact points 89 disposed in the path of apex 58 of the sequence switch 59 towards the end of its rotary cycle. Upon the energization of relay 88 armature 83 is attracted, breaking the locking circuit and releasing the four relays 77 to 81 which are then in readiness to store the qualifying signal of a subsequent quotation.

Thus it will be understood that the presence or absence of a fifth perforation 90, Fig. 4, accompanying each of the digit or fraction signals may control any desired qualification affecting the associated message. As illustrated, the presence of a perforation, depending in which of the four positions it occurs, correspondingly qualifies the signal as being either "open", "high", "low" or "last".

It will be understood that several modes of practice may be adapted in accordance with this invention whereby this superposed signal perforation appearing in either or any of the four positions might be used individually or conjunctively with the other of the four positions. That is to say, the four successive signal positions may in themselves constitute a permutation code or each signal may effect a control independently of the other of the four signals.

In order to control the range qualifications of a signal in accordance with the present illustration, four possibilities are necessary. Employing each of the four positions individually is one mode of controlling this qualification system and is the method employed in accordance with the present disclosure. Optionally, two or more of the four positions might be used permutatively in which case the presence or absence of a perforation in each of the positions determines the ultimate operation.

While the mechanism disclosed in Fig. 1 illustrates a perforated tape 44 as being the sole resultant of the keyboard device it will be understood, of course, that the several signals may instead of or in addition to being restored also be sent out on a communication line. By providing a set of contacts with the code bars 23 and 26 and a transmitting distributor of any conventional type electrical signals corresponding to those affixed to the tape 44 may be transmitted to a remote station.

In accordance with certain systems of transmission, complete quotation messages are introduced by a changed start pulse for purposes of synchronizing quotation message cycles. To accommodate systems of this class a sixth perforation 98 is provided with the final or fraction row of perforations as illustrated in Fig. 4. The effect of this synchronizing perforation upon the mechanism of a receiving station is fully described in connection with Fig. 3 of the parent application referred to above.

Figure 5:
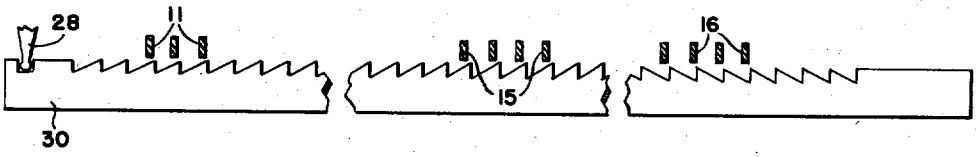
Fig. 5 is a detail side elevation of special code bar such as may be employed in connection with the control of the end-of-message perforator punch.

The arrangement of notches in the special code bar 30 is best indicated in Fig. 5, the ones under the alphabetical character keylevers 11 and the numerical digits keylevers 15 being of such inclination as to cause code bar 30 to be cammed rightwardly, while those under the keylevers 16 are of such inclination as to cam code bar 30 leftwardly.

In manipulating a keyboard perforator such as the one just described, the operator must introduce the qualifying signals before depressing those keylevers simultaneously with which the qualifying signals are installed upon the record. It is optional whether these signals be introduced before, intermediately with, or after the primary selecting of items characteristics, but in order to assure a regularity of a habit, the qualifying signals should be introduced at a definite and regular sequence during the transmission of each quotation.

Assuming that the operator desires to record a quotation ATT155¼, which quotation happens to be the high quotation of the day, the "high" keylever 17 is depressed, closing the contacts 91 and energizing the "high" relay 78 over the following circuit. From positive potential 87 through winding of relay 78, over line 92, contacts 91, to negative potential 83. The energization of relay 78 attracts its locking armature 86 as well as its control armature 93 maintaining the latter closed and preparing a circuit for the sequence switch 59 as follows. From positive potential 97 through the winding of range magnet 76, over line 96, contacts 95 of switch 87 (which are still open), line 94, armature 93, and line 84 to negative potential 83. Relay 78 is held locked by reason of the following locking circuit; positive potential 87, winding of relay 78, locking armature 86, locking circuit 82, armature 93, through line 84 to negative potential 83.

In this manner the signal is stored in relay 78 awaiting the progress of sequence switch 59 when its apex 58 arrives opposite switch 67 at which time the prepared circuit is closed, energizing the range magnet 76. This attracts armature 70 which in turn moves the fifth bar 20 leftwardly, causing to be presented the shoulder portion 32 of its associated interposition bar 31 into its punch effective position. When, thereafter, solenoid 37 is energized for effecting the punch operation an additional perforation 80 is made. As illustrated in Fig. 4 this perforation 80, in accordance with the present system, may appear in any of four positions, thereby determining the range of the associated message.

Figure 2:
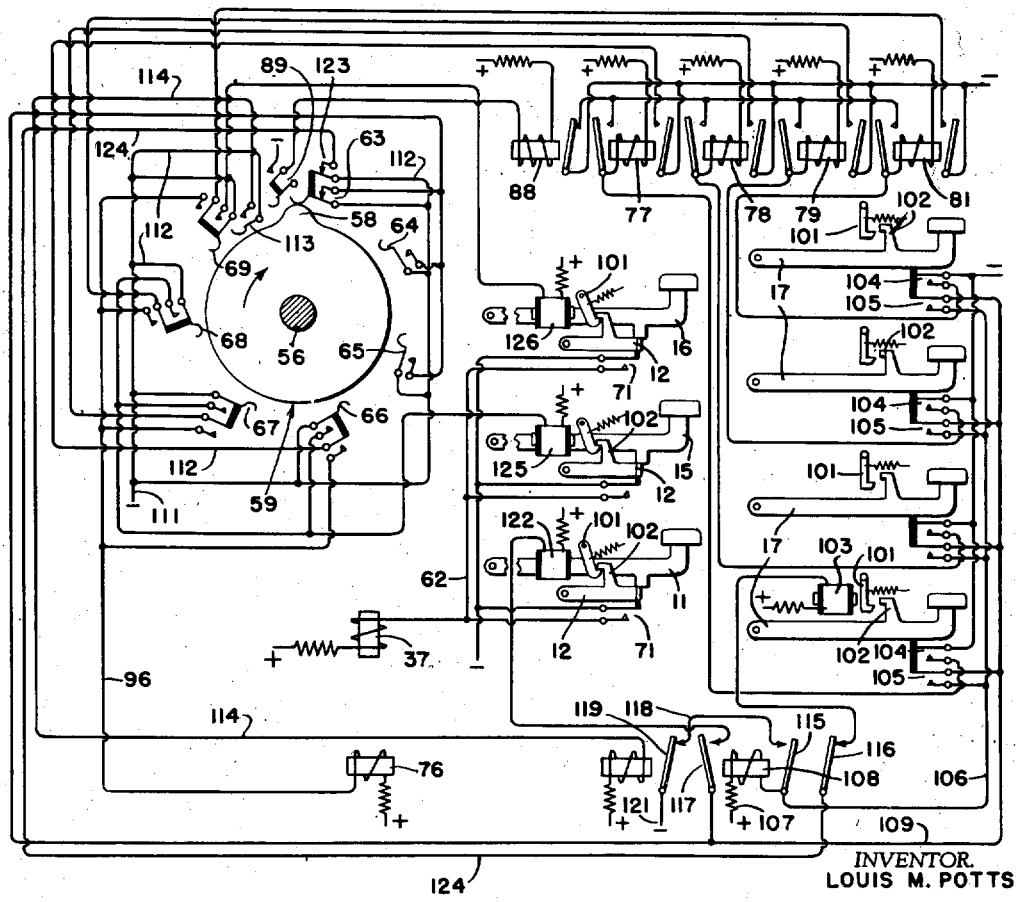
Fig. 2 is a wiring diagram of a modified keyboard apparatus embodying the present invention.

In Fig. 2, there is illustrated a modified keyboard arrangement for accomplishing the same objects as set forth in connection with the foregoing preferred disclosure in a somewhat different manner. In all cases of similar elements, the same reference characters are used in this modified disclosure as were used in the preferred embodiment so as to obviate detailed description of duplicated structures.

In this case the sequence switch 59 controls a set of contacts 63 through 69 and 89 similar to that illustrated in the preferred form, except that these contacts control a set of individual latches 101 which mechanically restrain each group of key-levers, permitting them to be operated only in accordance with the first described sequence of operation.

These latches 101 include hook portions which are adapted to engage cooperating lugs 102 integrally formed with each key-lever 17, in the case of the range keylevers, and bails 12 in the case of the quotation signalling keylevers 11, 15, and 16. The latch members 101 are normally spring urged to engage their overlying lugs 102 except during such times that their particular unlocking magnets are energized through the progressive operation of sequence switch 59. An unlocking magnet 103 is common to all of the latches 101 of the range keylevers 17 which when energized permits any one of them to be operated and correspondingly when deenergized, prevents any of them from being operated.

Each keylever 17 has associated with it two jointly operative sets of contacts 104 and 105, the latter of which are multipled over a circuit 106 extending from positive potential 107, over a relay 108, thence through the circuit 106, contacts 115, circuit 109 to the contacts 63, 64 and 65 of the sequence switch 59. A source of negative potential 111 is distributed around switch 59 over a circuit 112 communicating with each of the contacts 63 to 69, as well as switch 113 of an unlocking circuit 114. By the normally closed condition of contact 63 negative potential is supplied to circuit 109 and upon depressing any of the range keylevers 17 is extended through contacts 105 to the relay 108.

Upon thus being energized, relay 108 attracts its three armatures 115, 116 and 117 achieving the following results. Armature 115 contacts with its associated point completing the locking circuit for magnet 108 from positive potential 107, winding of relay 108, armature 115, conductor 118, armature 119, to negative potential at 121. Armature 116 breaks its contact with its associated point removing negative potential from the range unlatching magnet 103 and permitting the latches 101 of the range keylevers 17 to become effective in restraining the further operation of the range keylevers. Armature 117 makes contact with its associated point introducing negative potential from over line 109 to the items unlatching magnet 122, thereby withdrawing the latches 101 from all of the items keylevers 11.

Thus by depressing any of the keylevers 17 and closing a contact 105, an operator prepares the items keylevers for operation while also preventing the further operation of any of the range keylevers. Where, however, the four perforation positions are to be used permutatively those keylevers which are to be depressed must be manipulated simultaneously because the operation of any one or more of them disables the further operation of any others.

The range storage magnets 77 to 81 are similar to those described with the preferred embodiment as are the circuit connections between them and the contacts of the sequence switch 59. The depression of any of the keylevers 17 closing a pair of contacts 104 simultaneously with the closure of contacts 105 causes a locking of its associated storage magnet.

It will be understood, of course, that though two keylevers only of each class 11, 15, and 16 are illustrated, that this is merely for simplification of the drawings and that these are representative of a set similar to the one illustrated in Fig. 1.

As distinguished from the preferred embodiment, however, each set of keylevers 11, 15, or 16 is collectively locked by a corresponding set of latches 101 which engage the lugs 102 of their respective universal bail 12. The several latches.

of each class are controlled by a magnet individual thereto, which magnet is in turn electrically connected with one of the contacts of the sequence switch 59 (except item magnet 122), so that where in the first case the sequence switch merely prepared the circuits for effectuating the keylevers 11, 15, and 16, in the instant case the corresponding contacts of the sequence switch 59 unlock the latches 101 permitting the representative classes of keylevers mechanical freedom for operation.

It is to be understood that a set of code bars are provided with the several keylevers just as are illustrated in Fig. 1, though they are not shown in this figure and also that a tape feed mechanism and sequence switch stepping arrangement forms part of the present structure which is operative in the same manner as the preferred form.

Operating solenoid 37 is in this case, however, directly controlled by the several multipled contacts 71 which in turn are under control of the universal bails 12. The circuit for energizing the winding of solenoid 37 is quite obvious and need not, as in the case of Fig. 1, be dependent upon the sequence switch 59, since the order of operation of the control switches 71 is in this case mechanically dependent upon the operative condition of the several classes of keylevers for closing them.

The sequence switch 59 is normally in the position shown with the contacts 63 and 123 closed, the latter completing the circuit 124 for unlocking magnet 103 of the range keylevers 17, while the former supplies negative potential for energizing the relay 108 upon the depression of any keylevers 17. The other unlocking magnets 122, 125, and 126 remain deenergized, holding their respective classes of keylevers in a non-operable position and making it necessary for an operator to first depress one of the range keylevers 17 before the item keylevers 11 are yieldable to manipulation.

In manipulation, the modified form of Fig. 2 respond similarly to the preferred embodiment of Fig. 1 described above, except for the following differences. The sequence of operation of the various sets of keylevers 11, 15, 16, and 17 is positively and mechanically restrained so that if an operator, in attempting to depart from the proper sequence of operation, depresses the wrong keylever he may be apprised immediately by the resistance of the keylever that its depression is irregular, whereas in the preferred embodiment, the keylevers were at all times depressible but were effective only in their proper sequence.

The additional pair of contacts 113 peculiar to this embodiment which are located in the path of apex 58 during the final portion of its cyclic movement are provided for the purpose of energizing an unlocking magnet 127 which restores relay 108 to normalcy in preparation for a subsequent cycle of operation. This magnet influences an armature 119 which forms part of the locking circuit 118 of relay 108.

Figure 3:
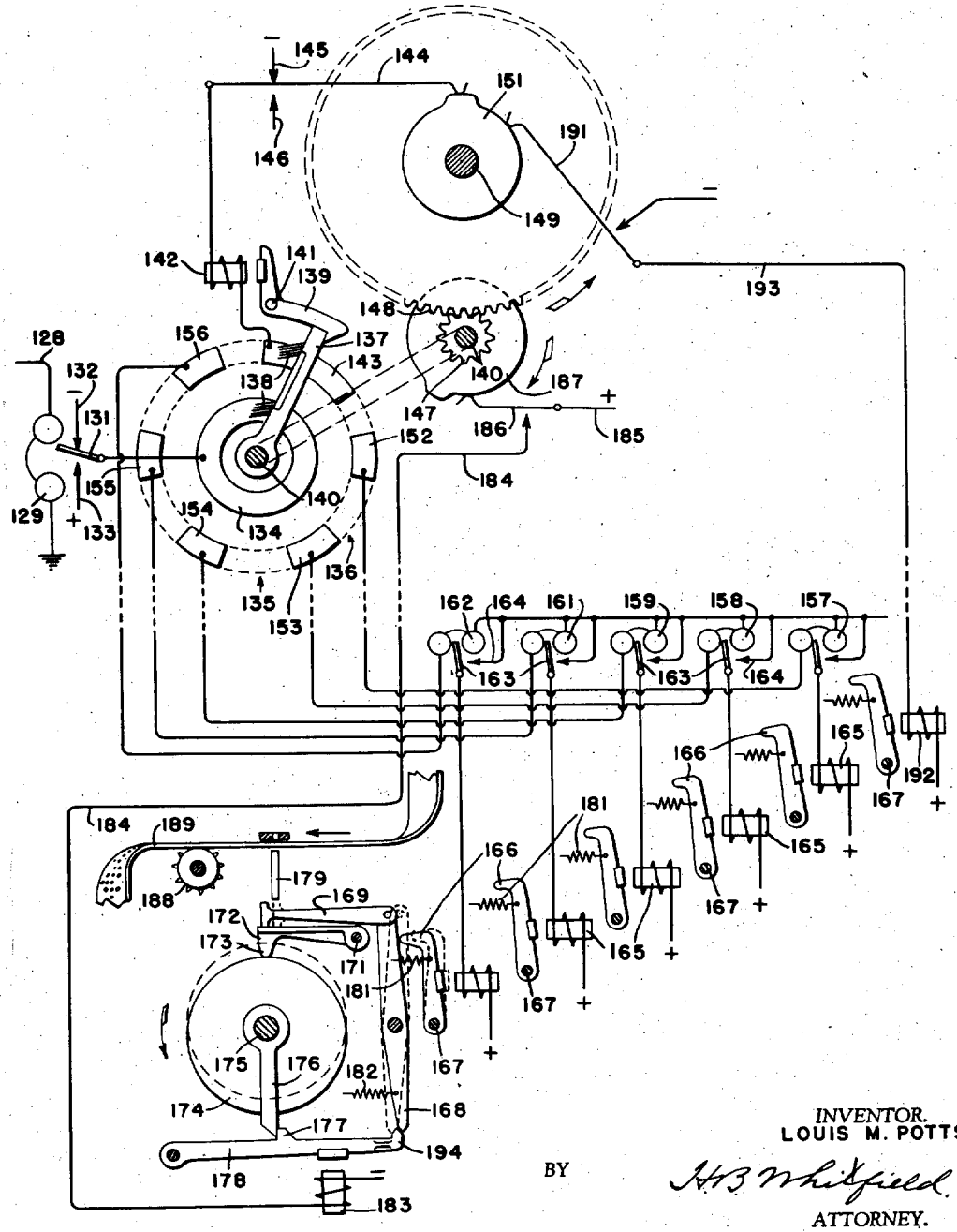
Fig. 3 is a general diagrammatic view of a remotely controlled perforating device.

It is frequently desirable to prepare a perforated tape in accordance with electrical signals transmitted from a remote station. In Fig. 3 is illustrated a perforating device such as is adapted to accomplish this object and which may be controlled by transmitting mechanisms of the kind described in the co-pending application referred to above, and which is capable of reproducing a control form similar to the form locally prepared by the transmitting perforator.

A signalling line 128 extends from the transmitting station and is connected to a polarized relay 129 having an armature 131 operable between negative and positive sources of current 132 and 133 connected to a solid ring 134 of a distributor 135. Distributor 135 also comprises a segmented ring 136 and a rotatable brush holder 137, the brushes 138 of which bridge the aforementioned rings 134 and 136. Brush holder 137 which is carried upon a shaft 140 frictionally driven from a suitable source (not shown) is normally withheld from rotation by an armature latch 139 pivoted at 141 and under the control of magnet 142. The winding of magnet 142 is connected at one terminal with the start segment 143 of distributor 135 and at its other terminal to an elecrical contacting follower 144 reciprocable between a pair of contacts 145 and 146 which communicate with negative and positive potential respectively. Shaft 140 also carries a pinion 147 which drives a gear 148 secured to a shaft 140 upon which is also carried a cam 151 which cooperates with the aforementioned follower 144.

The remainder of the segments 152 to 156 inclusive, of ring 136 are connected to individual polarized relays 157 to 162 inclusive, which act as an intermediate storage means for providing an overlap, as explained hereinafter, between incoming signals and the mechanism of the perforating device described hereinafter. The armature 163 of each storage relay 157 to 162 cooperates with a negative potential contact point 164 and is connected to one terminal of a selecting magnet 165, the other terminal of which communicates with positive potential. Each magnet 165 controls an individual selecting member 166, the several of which are pivoted on a common shaft 167. As illustrated in the drawings, the selecting members 166 and their associated magnets 165 are located one in back of the other for purposes of clearness, but it is to be understood that these elements in the operative structure are in alignment as are also their associated levers 168.

In cooperation with each member 166 is a detented lever 168 capable of assuming two positions as illustrated in solid and broken lines. Each lever 168 is articulated to an interposition bar 169 generally similar to the bars 31 of Fig. 1, while below the several bars 169 and pivoted at 171 is a table 172 having integrally formed therewith a projection 173. A cam 174 is secured to a frictionally driven shaft 175 and is adapted to cooperate with the projection 173 for imparting vertical reciprocative motion to the table 172. A stop arm 176 is also secured to shaft 175 and is adapted to be engaged by a tooth 177 formed upon an armature 178.

The table 172 in receiving its motion from cam 174 imparts a similar movement to the several interposition bars 169 above which are located a set of six punches 179 which form part of the punch die assembly as in the case of the perforator of Fig. 1. In operation, certain magnets 165 are cyclically energized while the remainder of them remain deenergized in accordance with the particular code combination that is being recorded. Springs 181 of members 166 being more powerful than those 182 of levers 168 overcome the tendencies of the latter during the deenergized condition of magnets 165, causing the levers to assume the solid line positions as illustrated, but when, on the contrary, the magnets 165 are energized in accordance with the code combinations of a signal, members 166 are withdrawn against the tendencies of the springs 181, permitting levers 168 to assume their dotted line positions under the influence of their individual springs 182. The condition of the several storage relays 157 to 162 is transmitted to the operating magnets 165 and is simultaneously translated into corresponding positions of the members 166 and thereafter to levers 168 and bars 169. After each signal is thus translated, an operating pulse is received by a magnet 183 which thereupon attracts its armature 178 releasing stop member 176 which travels in a counterclockwise direction through one revolution thrusting table 172 and bars 169 upwardly and affixing a set of perforations in accordance with the positions of the several bars 169. The start pulse which energizes magnet 183 is received over a conductor 184 from the positive source of current 185 through the periodic intervention of a contactor 186 controlled by a cam 187, which is also secured to driving shaft 140.

It will be understood, of course, that the proper means represented by sprocket 188 are provided for intermittently advancing the tape 189 as each alignment of perforations is installed.

As in the case of Fig. 1, the gear ratio between shafts 149 and 140 is such that the latter rotates one complete revolution for each one-seventh of a revolution of the former. During the seventh revolution of the distributor shaft 140 when the cam 151 is making its final one-seventh of a revolution, the apex of cam 151 encounters the cam follower 191, raising the latter into contactual engagement with a negative source of current, thereby completing the circuit for the sixth magnet 192 over conductor 193. This magnet controls a sixth perforating punch which installs the sixth perforation 90 in the same maner as described in connection with Fig. 1, and for the same purpose. The tape perforated by this mechanism is accordingly an exact reproduction of the tape at the transmitting station, all of the signals being electrically relayed from the latter except the last described sixth perforation 90, the making of which is entirely controlled by apparatus local to the perforation station, Fig. 2.

In the operation of the present device, as a set of five permutation impulses are received over line 128, they are distributed to the five relays 157 to 162 by the distributor 135 during one of its cycles of rotation. Relays 157 to 162 being of the polar type, retain the storage signal momentarily and until a subsequent and different set of signals are received. The stored signals are then relayed to the five operating magnets 165 which cause a corresponding distribution of the several members 166. At this time, armature 178 is retracted by its magnet 183 in accordance with a signal and permits the free rotation of shaft 175 while also withdrawing its detent edge 194 from the cooperating portions of levers 168. Levers 168 thereupon are permitted to assume positions corresponding to their respective members 166 after which armature 178 is again released, detaining the several levers in their assumed positions and permitting the members 166 to receive a new signal. Thus an overlap of operation is afforded as between the members 166 and the interposition bars 169 so that a new signal is stored while the previous signal is being perforated.

After shaft 140 has completed six revolutions and is in the midst of its seventh revolution, the apex of cam 151 encounters the follower 191, establishing a circuit for the sixth magnet 192 which thereupon causes the perforation of the sixth hole as already explained.

It will be understood that numerous modifications and variations of the present invention may be made without departing from the scope or spirit thereof. Accordingly, it is not intended to be limited by any of the foregoing description nor by the particular illustrations in the accompanying drawings, but instead to be permitted a reasonable latitude of interpretation of the present invention as expressed in accordance with the hereinafter appended claims.

What is claimed is:

1. In a machine for perforating a record material, means to make a group of code perforations in said material, mechanical means to control the making of certain of said perforations, and electrical means to control the making of other perforations.

2. In a tape perforating machine, a plurality of keylevers, means responsive to the operation of any one of said keylevers and remaining operative after the restoration of said keylevers, and means responsive to said means for subsequently perforating the tape in accordance with the operative condition of said keylever responsive means.

3. In a tape perforating apparatus, a plurality of groups of key levers each associated with a class of characters, a set of perforating elements controlled by said keylevers, and means under the control of each keylever of a group to condition for operation the keylevers of another group in a predetermined sequence.

4. In a keyboard control apparatus, a plurality of groups of individually operable keylevers, and means under the control of each keylever of a group for preparing for operation the keylevers of another group in a predetermined sequence.

5. In a keyboard control apparatus, a plurality of groups of keylevers, means individual to each group for normally latching its keylevers against freedom of operation, and a device operative in a predetermined sequence for withholding said latching means of each group under the control of a keylever of a previously operated group.

6. In a keyboard control apparatus, a plurality of groups of keylevers, a sequence switch, means under control of said keylevers for advancing said switch, a set of performing elements, and means under control of said switch for successively effectuating an operative connection between said groups of keylevers and said set of performing elements.

7. In a tape perforating apparatus, a set of perforating punches, a plurality of groups of keylevers, and a progressively operated sequence switch under control of said keylevers for disabling the operative connection between certain of said keylevers and said punches.

8. In a perforating apparatus, a set of perforating elements, a plurality of sets of keylevers, each set corresponding to said elements, and a sequence device operative upon said elements for progressively maintaining operative connection between one set only of said keylevers and said elements.

9. In a keyboard apparatus, a plurality of keylevers representing letters, a plurality of keylevers representing digits, a plurality of keylevers representing fractions, a set of latching members for each of said pluralities of keylevers, and a sequentially operating device for conditioning said keylevers successively to assure proper sequence of manipulation.

10. In a remote controlled perforating device, a set of punches, a frictionally driven punch operating shaft, a set of selectable punch conditioning members, and a magnetically controlled release clutch for said shaft including a detent portion cooperating with said members for retaining them in each selected position during the perforating operation.

11. In a perforating device, a set of punches, a corresponding set of punch conditioning elements, a distributor including means responsive to a set of signals in a sequence for correspondingly controlling said elements, a detent member operative to hold said punch conditioning elements in a setting while a subsequent setting is impressed upon said controlling means, and a magnet cyclically controlled by said distributor for withdrawing said detent member periodically to permit said conditioning elements to assume positions in accordance with said controlling means.

12. In a machine for perforating a control form, a set of punches arranged in an alignment transversely of the form to be perforated, a set of conditioning members each associated with one of said punches, control means for setting certain ones only of said members to condition their associated punches to make in a single operation perforations corresponding to a permutation code system, and control means for setting other ones of said members to condition their associated punches to make perforations constituting independent signal conditions installed concurrently with the code perforations.

13. In a telegraph signal apparatus, a set of manually operable keylevers, a set of code bars, certain of said keylevers effective to immediately position some of said code bars, electromagnetic operating means for other of said core bars effectuated by certain other of said keylevers for subsequently positioning said other of said code bars, and means for controlling the transmission of telegraph signals concurrently in accordance with the settings of all of said code bars.

14. In a telegraph keyboard apparatus, a set of tape perforating punches, a plurality of keyboard control levers, a signal storage means variably responsive to manifest the actuation of certain ones of said control levers, some of said control levers having direct setting control over certain of said punches, and means controlled by said storage means for setting other of said punches.

15. In a perforating machine, a set of punches, an actuator for said punches, a set of enabling members individually selectable to operate any of said punches under the power of said actuator, storage signal means for selecting certain of said members, and original signal means for selecting other of said members.

16. In a perforator, remotely controlled means to make certain code perforations in a material, and locally controlled means to make other code perforations in said material.

17. In a keyboard, a series of groups of keys, a lock individual to each group of keys, and means to operate and release said locks to permit the operation of keys in the different groups according to a predetermined sequence.

18. In a perforating machine, means to make code perforations in a material, local means to determine certain of said perforations, and remotely controlled means to determine other of said perforations.

19. In a perforator, means to perforate a series of groups of perforations in a material according to the signals to be transmitted, and automatic means to perforate additional holes to identify each series.

20. In a tape perforator, remotely controlled means to make perforations in said material representing characters, and locally controlled means to make other perforations to distinguish between other characters.

21. In a perforator, a plurality of perforating elements, means controlled in accordance with a code of electrical impulses for selecting certain of the perforating elements to be operated, and means independent of the code impulses for conditioning a certain other perforating element to be operated.

22. In a keyboard controlled apparatus, a plurality of keylevers, a set of function elements to be controlled by said keylevers, electric storage relay means responsive to the depression of certain of said keylevers for conditioning some of said elements for operation, and means controlled by other of said keylevers for directly operating certain of said elements and for concurrently operating said conditioned elements.

23. In a perforating apparatus, a set of perforating elements and a common actuator for said elements, a plurality of sets of keylevers, a sequence device to effect the successive cooperation between each of said sets of keylevers and said perforating elements, and means under the control of said common actuator device for advancing said sequence device.

24. In a tape perforating device, a plurality of perforating elements certain of which relate to a principal class and certain other of which relate to an auxiliary class, a plurality of keylevers comprised of predetermined groups each group of which corresponds to an associated class of information, certain keylevers of a group having operative control over said perforating elements relating to a principal class, certain other keylevers of a group having operative control over said certain other of said elements, and means for moving conditioned ones of said perforating elements of both groups simultaneously to install corresponding perforations upon a control form.

25. In a perforating and tape feeding device, a plurality of groups of keylevers, means under the control of certain groups of said keylevers to establish stored signal conditions relating to corresponding elements of a code, means under the control of other of said keylevers for establishing signal conditions associated with said elements of a permutation code system, and means for conditioning said other of said keylevers in accordance with a predetermined operation of said principal keylevers.

26. In a tape perforating machine, a plurality of keylevers, means under the control of certain of said keylevers for making code perforations in a tape, predetermined numbers of said perforations comprising units of information, each unit of information being terminated by the operation of certain others of said plurality of keylevers, and means controlled by said certain others of said plurality of keylevers for making a special perforation in the tape.

27. In a perforating device, a set of keylevers, a set of storage relays, means under the control of certain of said keylevers directly for making perforations in a tape, and means under the control of certain other of said keylevers to condition said relays for making other perforations in the tape, said other perforations being made concurrently with the subsequent operation of said certain of said keylevers.

28. In a perforator, means under the control of a remote station for making legendary or communication signals upon a control form, and means operative under local stimulus for making collateral function controlling marks on said form.

29. In a keyboard apparatus for the cyclic transmission of telegraph signals, a plurality of keylevers, signal setting devices to be arranged in accordance with the elements of a permutation order in response to the actuation of certain keylevers, a set of storage relays, means under the control of certain ones of said keylevers for imparting a signal storage setting to said relays, and circuit connecting means between the said storage relays and said setting means for communicating a stored signal condition thereto during a predetermined interval of a transmission cycle.

30. In a keyboard perforating apparatus, a set of perforating punches arranged in an alignment transversely of an intermittently fed control web, a plurality of sets of keylevers to be actuated in a predetermined sequence, means under the control of each keylever for conditioning and initiating the actuation of said punches, a bank of signal storage elements responsive singly or in multiples, a further set of keylevers for storing a signal in said bank of elements, and means automatically responsive during a transmission cycle for imparting the setting of said elements to said punches.

31. In a keyboard tape perforator for the installation of primary code perforations in a control form, a mechanism for superimposing a collateral code signal element adjacent said primary signal codes including a set of punches, a punch hammer for actuating said punches, conditioning elements for communicating the blow from said punch hammer to said punches, a plurality of keylevers manually actuated to move said interposition elements, and an electromagnet responsive to a storage setting for moving one of said interposition elements independently of said keylevers.

32. In a tape perforating mechanism, a set of punches, means for feeding web material longitudinally so as to present new surface areas of a web opposite said punches, a plurality of keylevers for setting said punches variously in accordance with the elements of a permutation order, signal storage means for conditioning certain ones of said punches in response to stored signals, and means under the control of said keylevers and said storage means for actuating said tape feeding means.

33. In a tape perforating apparatus, a plurality of keylevers arranged in groups to be operated in a predetermined succession, a set of storage elements, a set of permutation code members, and means responsive to a predetermined succession of operations for accordingly rendering said code members responsive to said keylever groups and said storage means.

34. In a keyboard device for perforating an occasional and non-character signal in accompaniment with a plurality of character signals, the combination including, a perforating apparatus, a plurality of keylevers arranged in several groups in accordance with a predetermined operating sequence and each keylever having a control influence upon said perforating apparatus, and means incidentally controlled by any of the keylevers of a certain group including an occasional signal perforating punch and a device for conditioning said punch.

35. In a keyboard perforating apparatus, a set of punches for making character code perforations, a punch for making an occasional perforation, a plurality of key members allocated in predetermined groups, and means under the exclusive control of certain key members relating to one group for operating both said code making and said occasional punches.

36. In a keyboard perforating device, punch means for making code signal perforations, punch means for making synchronizing index perforations, manipulators for permutatively controlling the operation of said signal making punch means, and means under the control of certain of said manipulators only for conditioning said synchronizing index perforating means collaterally to their signal perforation control.

37. In a perforating machine, a set of punches permutatively conditionable for making code signal perforations, punch means for making an occasional index perforation, means under the control of permutation code signals for accordingly conditioning said code punches, and means operative incidentally to said conditioning control and upon predetermined occasions only for actuating said occasional perforating means automatically.

38. In a perforating machine, a set of punches for making code signal perforations, interponents settable for conditioning said punches, punch means for making an occasional index perforation, means under the control of permutation code signals for operating said interponents, and means operative incidentally and upon predetermined occasions for actuating said occasional punch means automatically.

39. In a perforating machine, a plurality of permutation code punches, an occasional index punch, means responsive to permutation code telegraph signals for conditioning said code punches, and means responsive to a periodically recurring local stimulas for operating said index punch.

40. In a perforating machine, a plurality of permutation code punches, an occasional index punch, manipulators for conditioning said code punches in accordance with a permutation code, and means responsive to a periodic control operation for actuating said index punch.

41. In a keyboard perforating device, a plurality of key members arranged in groups in accordance with a predetermined operating sequence, a set of perforators alternatively conditionable and each perforator movable into one of its alternative positions by any of said key members, a special perforator for marking to denote a predetermined position with reference to a plurality of code perforations, and means for actuating said special perforator under collateral supervision of the key members of one of said groups.

42. In a keyboard perforating device, a plurality of key members grouped in accordance with a predetermined sequence, a plurality of tape perforating punches, means under the control of any of said plurality of key members for making character code perforations having characteristics individual to said key member, and means under the control of any key member of a class for making a non-character perforation for denoting a position relative to the sequence of said perforation.

43. In a keyboard perforating machine, a set of punches, key controlled means for permutably conditioning said punches for actuation, means responsive to a predetermined conditioning operation in a sequence for making a non-character code perforation, and perforations for denoting the end of said sequence.

44. In a perforating machine, a set of punches, permutation means for conditioning and actuating said punches to make groups of permutably arranged perforations transversely in a control form, a special marker, and means initiated and operated concurrently with a predetermined one of said group for conditioning and operating said special marker.

45. In a control form perforating machine, a plurality of manipulators arranged for operation in a predetermined sequence and grouped to comprise several classes, a set of code perforating punches conditioned by any manipulator of said several classes, and an index perforator conditioned in one manner by the manipulators of one group and in a different manner by the manipulators of another group.

46. The combination set forth in claim 45 in which the manipulators of one group are the first of an operative sequence of groups of manipulators and in which the manipulators of said other group are the final ones of said sequence.

47. In a device for making character perforations in a form, means for operating a set of punches in accordance with a predetermined sequence or succession, and means for marking on a form spontaneously an index indicative of said sequence or succession.

48. In a keyboard device, a plurality of classes of manipulators, a single form conditioning apparatus, means for controlling said apparatus by the actuation of any of said classes of manipulators, and a device under the control of the keylevers of a certain one of said classes for producing a characteristic record on the form distinguishing its class from others of said classes.

49. In a keyboard apparatus, a set of punches, a plurality of sets of keylevers, each keylever of said sets being operatively associated with said set of punches, and means for making a class designation mark under the control of all of the keylevers of a set to characterize its set.

50. In a code recording device, means to prepare a record composed of varying code impressions under the control of permutative signals, and an additional means operative periodically for making an occasional impression to accompany said code impression.

51. In a perforating machine, a set of punches, signal control means for conditioning and actuating said punches to make groups of permutably arranged perforations transversely in a control form, and means locally initiated and operated concurrently with a predetermined one of said groups for conditioning and operating a punch to make an index perforation in said tape.

52. In a keyboard apparatus, a plurality of sets of keylevers, a sequence apparatus for compelling the operation of said sets of keylevers in a predetermined succession, and a periodicity index automatically operative to make a mark contemporaneously with the operation of a keylever relating to a final set in said succession.

LOUIS M. POTTS.